United States Patent [19]
Willcox

[11] Patent Number: 6,093,025
[45] Date of Patent: Jul. 25, 2000

[54] APPARATUS FOR TEACHING HORSEBACK RIDING

[76] Inventor: Jill F. Willcox, 221 Ivy Mills, Glen Mills, Pa. 19342

[21] Appl. No.: 09/257,431

[22] Filed: Feb. 25, 1999

[51] Int. Cl.[7] .............................. A63B 69/00; G09B 19/00
[52] U.S. Cl. ............................................ 434/247; 434/250
[58] Field of Search ................................. 434/247, 255, 434/258, 260; 482/51, 66, 69, 105; 472/133

[56] References Cited

U.S. PATENT DOCUMENTS

| | | | |
|---|---|---|---|
| D. 177,948 | 6/1956 | Smith | D34/15 |
| 1,914,732 | 6/1933 | Breault | 446/28 |
| 2,659,600 | 11/1953 | Becker | 272/1 |
| 2,707,102 | 4/1955 | Wendt | 272/1 |
| 3,003,761 | 10/1961 | Young | 272/1 |
| 3,224,762 | 12/1965 | Strader | 272/1 |
| 3,321,117 | 5/1967 | Hedin | 223/107 |
| 3,672,075 | 6/1972 | Eikelnboom | 434/247 |
| 3,751,828 | 8/1973 | Frame | 434/247 |
| 4,190,968 | 3/1980 | Clapp | 434/247 |
| 4,957,444 | 9/1990 | Armen | 434/247 |
| 4,988,300 | 1/1991 | Yamaguchi | 434/247 |
| 5,316,515 | 5/1994 | Hyman et al. | 446/28 |
| 5,429,515 | 7/1995 | Greenwood | 434/247 |

*Primary Examiner*—Kien T. Nguyen
*Assistant Examiner*—Kurt Fernstrom
*Attorney, Agent, or Firm*—Robert S. Lipton, Esq.; Lipton, Weinberger & Husick

[57] ABSTRACT

The present invention comprises an apparatus and method of using the apparatus for teaching horseback riding skills without the use of a horse. The apparatus is secured to the student so that the student may move about. The student uses reins to manipulate a bit. A pendulum suspended from a spring simulates the motion of a horse's mouth. A feedback mechanism compares the tension exerted by the student on the reins to the simulated motion of the horse's mouth, assisting the student in learning how to follow the bit and other riding skills.

31 Claims, 5 Drawing Sheets

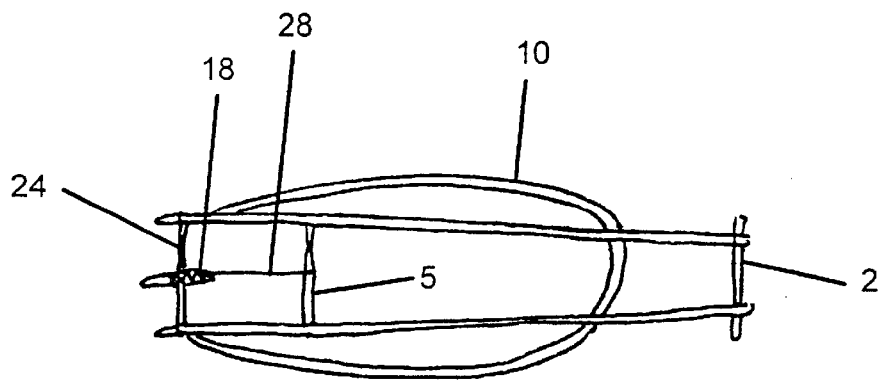
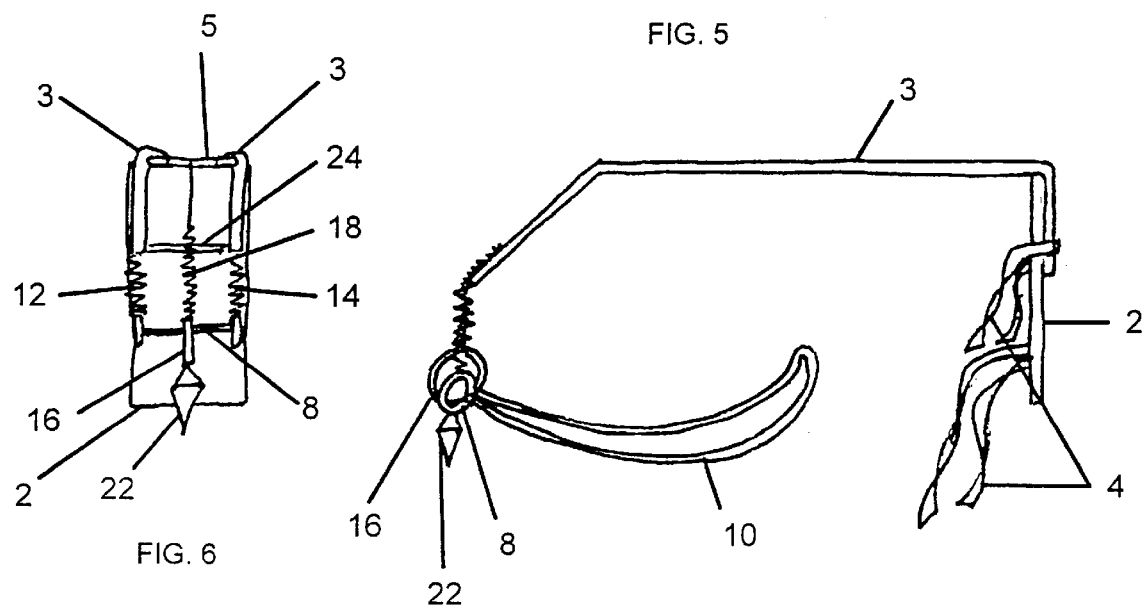
FIG. 5
FIG. 6
FIG. 4

APPARATUS FOR TEACHING HORSEBACK RIDING

BACKGROUND OF THE INVENTION

1. Field of the Invention

The invention is a kinesthetic learning apparatus and method for using the apparatus to aid in teaching several equestrian concepts concerning the relationship between horse and rider. Included among those concepts are proper posture, following the horse's mouth with the hands, collection and balance theory, lateral concepts and coordination of the aids. The invention generally assists in teaching body self-awareness to both beginning and advanced riders and helps to protect horses from injury and ruin due to unskilled or insensitive riders.

2. Description of the Related Art

Equitation is a subtle physical and mental skill involving a sensitive two-way communication between rider and horse. The instructions provided by the rider to the horse are known as "aids." The controlled application of aids requires that the rider carefully control his or her lateral balance and weight distribution at all times and be aware of the lateral balance and weight distribution of the horse. The lateral balance and weight distribution of horse and rider are known generally as "lateral concepts."

Reins held in the hands of the rider control a bit placed in the mouth of the horse. The rider must maintain his or her hands stationary with respect to the bit to prevent unintended aids to the horse. In the terms of those skilled in the art, he hands of the rider must "follow" the bit while maintaining "connection," independent of other motion of the horse or rider.

Awareness of collection and balance theory is a desirable skill for the equestrian. Collection and balance theory includes weight distribution longitudinal to the body of the horse and includes generally the posture of the horse. A well-trained horse will flex its hocks while stretching into the bit, a posture known as "engagement" by those skilled in the art of horsemanship.

The time-honored method of teaching coordination of the aids, following the bit, connection, collection and balance theory and engagement involves placing the student on a horse and providing advice and criticism by the instructor. The process is unsatisfactory and frequently frustrating for student, instructor and horse, due to the multiple and subtle skills which the student must simultaneously apply.

The process also can be injurious to the horse. An unskilled or heavy-handed student at best will confuse the horse, and at worst can injure and desensitize a horse to the point that the horse no longer responds to a sensitive, skilled hand.

The present apparatus and method solve the problems presented by the traditional method. The present apparatus and method allow the instructor to isolate and to separately teach many of the important equestrian skills. The method of learning is primarily kinesthetic, in that the student learns by the tactile sense and by moving his or her body. The frustration of the student is reduced and learning is enhanced because the student is required to learn only one skill at a time. The risk of injury to the horse is reduced because the student learns the most fundamental skills without using a horse.

The prior art does not teach or suggest the present apparatus or method. The prior art, as shown by U.S. Pat. No. 3,751,828 to W. Frame issued Aug. 14, 1973, reveals a device to assist learning of the proper rein tension for a snaffle and a curb bit. The Frame invention consists of a spring-loaded reins attached to switches and lights to visually signal the student. The Frame invention does not assist the instructor in teaching any skill other than providing an indication that the appropriate tension has been applied to the reins. The Frame patent does not teach or suggest the use of a back brace secured to the student for teaching posture, or the use of a frame and pendulum to simulate the motion of a horse. The back brace, pendulum and frame of the present invention allow the invention to be used to teach following of the bit and to teach lateral concepts and collection and balance theory, none of which is taught or suggested by Frame.

Several patents have been issued for children's hobbyhorses, none of which are useful for teaching the subtleties of riding. See, for example: U.S. Pat. No. 5,316,515 to G. Hyman issued May 31, 1994; U.S. Pat. No. 3,224,762 to G. Strader issued Dec. 21, 1965; U.S. Pat. No. 3,003,761 to E. Young issued Jan. 23, 1959; U.S. Pat. No. 177,948 to T. Smith issued Jun. 5, 1956; U.S. Pat. No. 2,707,102 to R. Wendt issued Apr. 26, 1955; U.S. Pat. No. 2,659,600 to W. Becker issued Nov. 17, 1953; and U.S. Pat. No. 1,914,732 to E. Breault issued Jun. 20, 1933.

The prior art does not teach or suggest an apparatus for teaching the equestrian arts by securing the apparatus to the student so that motion of the student is transmitted to the apparatus to simulate the motion of the horse's body. The prior art does not teach or suggest use of a pendulum to simulate the rhythmic motion of the horse's head and mouth. The prior art does not teach or suggest use of a ring as a visual or audible feedback mechanism to apprise the student of his or her success in manipulating the bit.

SUMMARY OF THE INVENTION

It is an object of the present invention to provide an apparatus and method of using the apparatus for teaching horseback riding to allow the necessary equestrian skills to be isolated and separately taught.

It is a further object of the present invention to provide an apparatus and a method for using the apparatus where the beginning rider may learn initial skills to safely ride without subjecting a horse to confusion or abuse due to unskilled or rough use.

It is a further object of the present invention to provide an apparatus and method for teaching otherwise difficult concepts such as coordination of the aids, stretching into the bit, lateral concepts, following the bit and collection and balance theory.

The apparatus and method of the present invention accomplish the foregoing objects.

The apparatus includes a backboard secured to the student. A frame is attached to the backboard and projects to the front of the student. A reins is held in the hands of the student and is attached to a suitable transverse member, preferably a straight snaffle bit. The straight snaffle bit is attached to the frame using springs to simulate for the student the motion and tactile feel of the bit in the horse's mouth.

A ring encircles the bit and is suspended from the frame by a pendulum spring. The ring and pendulum spring together form a pendulum. The ring is appropriately weighted and the pendulum spring is of an appropriate length, rate and flexibility so that the period of the pendulum approximates the motion of the head of a horse as the student walks while wearing the apparatus. The pendulum spring allows the pendulum to move in the vertical direction in response to motion of the frame, further simulating the motion of a horse.

The ring is sized so that its internal diameter is large compared to the outside diameter of the bit. The ring provides a feedback mechanism by which the student can gauge the success of his or her efforts. The efforts of the student are successful if the student can manipulate the reins so that the bit does not engage the ring.

In use, the apparatus is secured to the student using straps or other suitable fastening means. The back brace is maintained in firm contact with the back of the student. The back brace provides a tactile reminder to maintain an upright posture while riding. Observing the student in a seated position while wearing the apparatus allows the instructor to evaluate the seated posture and lateral weight distribution of the student.

When the student walks wearing the device, the motion of the student's legs and hips is transmitted by the backboard to the frame, causing the frame to rhythmically move. The rhythmic motion of the frame imparts rhythmic motion to the ring, simulating the motion of a horse's head and mouth. The student learns to manipulate the reins to move the bit against spring tension to maintain a constant, gentle tension on the reins to prevent the bit from engaging the ring. The bid and ring provide visual or auditory feedback to the student. The student thereby learns to dissociate his/her hands from his/her own body and to follow the bit.

While the pendulum is the preferred means to simulate motion of the horse's head and mouth, any other of the many familiar devices capable of periodic motion may be employed. For example, a spherical weight free to roll on a saucer-shaped surface may be substituted.

The ring-and-bit feedback means depends upon visual observation by the student or upon audible engagement of the ring and bit. Other feedback means may be employed. For example, the ring and bit when engaged may make or break an electrical circuit. The electrical circuit may be used to activate a tactile, visual or audible signal to provide feedback to the student. The tactile signal may be a vibrating signal transmitted to the hands of the student.

The ring-and-bit feedback means is the preferred embodiment; however, many equivalent designs are possible and are encompassed within this invention. For example, the pendulum may assume the shape of a rod and an opening may be provided in the bit to receive the rod.

BRIEF DESCRIPTION OF THE DRAWINGS

FIG. 4 is a side view of the apparatus.

FIG. 5 is a top view of the apparatus with the straps removed.

FIG. 6 is a front view of the apparatus with the reins and straps removed.

DESCRIPTION OF THE PREFERRED EMBODIMENT

Figure 1:
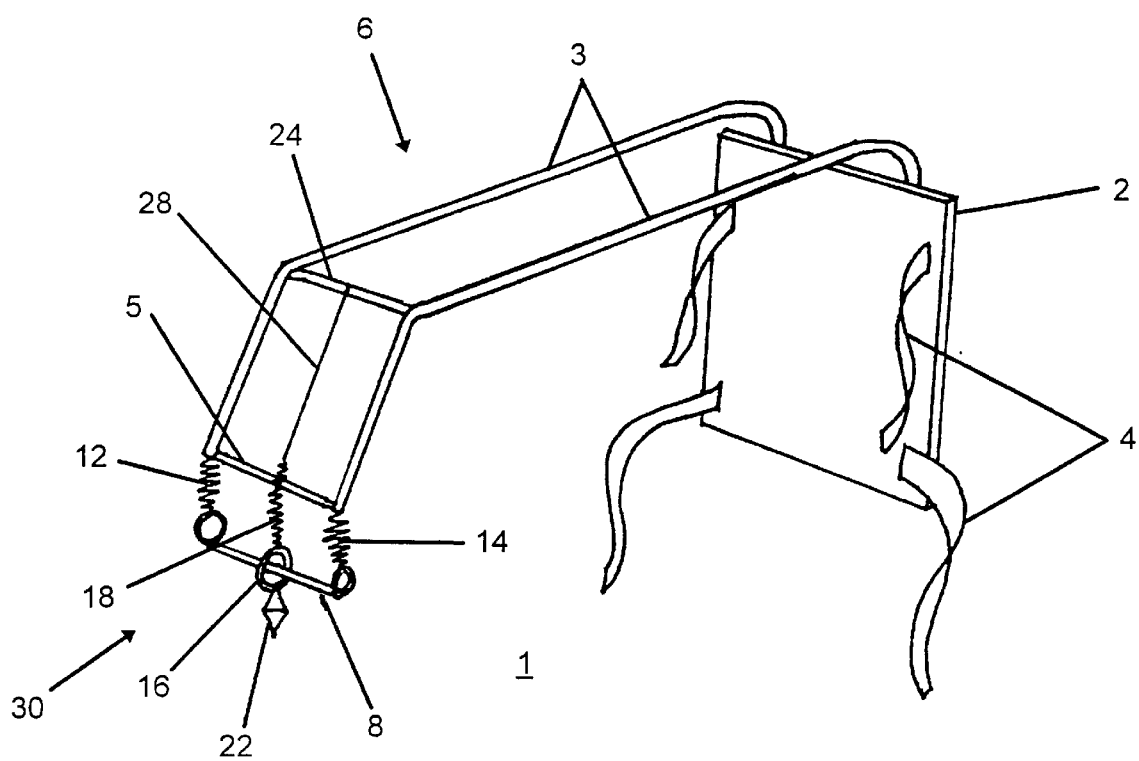
FIG. 1 is a perspective view of the apparatus with the reins removed.
Figure 2:
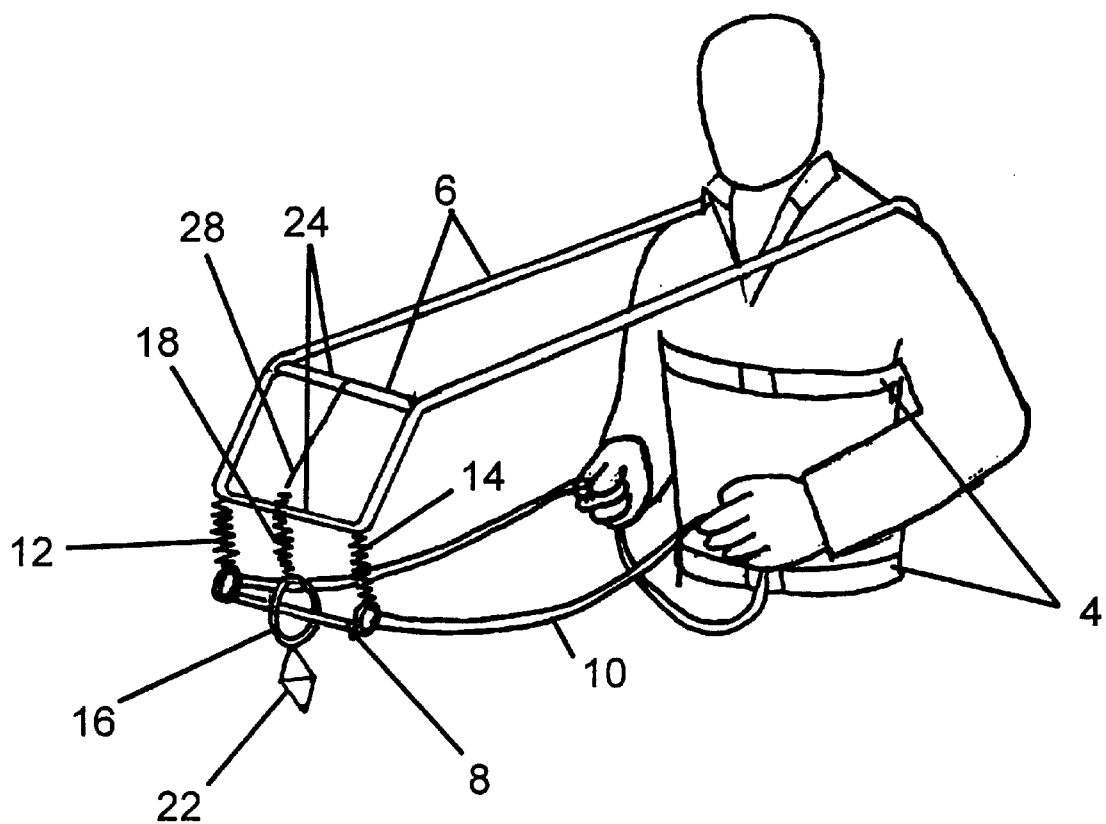
FIG. 2 is a perspective view of the apparatus with the reins attached being operated by a student.

In the preferred embodiment as illustrated by FIG. 1, the apparatus 1 includes a rigid backboard 2. The backboard 2 is preferably two feet in length and one foot in width. Straps 4 are attached to the backboard 2 and used to secure the backboard 2 to the back of the student. A frame 6 is rigidly attached to and extends perpendicularly from the backboard 2 generally in the horizontal plane. Frame 6 includes longitudinal members 3 connected to each other by upper crosspieces 24 and lower crosspieces 5 and upper crosspiece 24. As shown in FIGS. 1, 2, and 4, in the preferred embodiment, the frame 6 extends from the backboard 2. In the preferred embodiment, the frame extends 60 inches. At a point beyond the arm length of the student from the backboard, the longitudinal members 3 of frame 6 bends downward at a 45 degree angle from the horizontal. In the preferred embodiment, the location of the downward bend in the frame 6 is approximately 42 inches from the backboard. Frame 6 terminates approximately eighteen inches from the location of the bend. Lower crosspiece 5 and upper crosspiece 24 of frame 6 reinforce the frame.

A first elastic member 12 and a second elastic member 14 depend from longitudinal member 3 of the frame 6, although they may depend from lower crosspiece 5. Elastic members 12 and 14 are springs in the preferred embodiment. A transverse member which in the preferred embodiment is a snaffle bit 8 extends between the first elastic member 12 and the second elastic member 14.

Reins 10 shown in FIGS. 2, 4, and 5, is attached to the straight snaffle bit 8 and are manipulated by the student. When the student exerts tension on the reins 10, the straight snaffle bit 8 is pulled toward the student against the tension of the first elastic member 12 and the second elastic member 14. Elastic members 12 and 14 are selected so as to provide resistance to the motion of the straight snaffle bit 8 equivalent to the resistance provided by the mouth of a horse. In the preferred embodiment, elastic members 12 and 14 are coil springs approximately six inches in length.

A ring 16 encircles the straight snaffle bit 8 as is shown in FIGS. 2, 4 and 6. The ring is preferably of two to four inches in inside diameter. The ring is attached to and supported by a pendulum spring 18. In the preferred embodiment, the pendulum spring 18 is attached to and supported by a cord 28. The cord 28 is secured to upper crosspiece 24 of the frame 6. A weight 22 depends from the ring 16. The ring 16, weight 22 and pendulum spring 18 together form a pendulum 30 as shown in FIG. 1 capable of moving generally in a horizontal plane in response to motion of the frame 6. The ring 16 and weight 22 also move in the vertical direction in response to elastic deformation of the pendulum spring 18. The ring 16, weight 22 and pendulum spring 18 are selected so that the motion of the ring 16 simulates the motion of the head and mouth of a horse in response to motion of the frame 6 induced by movement of the student. In the preferred embodiment, the pendulum spring 18 is twelve inches in length.

As shown in FIGS. 1 and 2, in use the apparatus 1 is secured to the student by straps 4. The backboard 2 is held firmly against the back of the student. The frame 6 passes over the shoulders of the student. The student holds the reins 10. Movement by the student induces movement of the backboard 2 and frame 6. The resulting movement of the frame 6 induces movement of pendulum 30, weight 22, ring 16 and pendulum spring 18. The movement of the weight 22 and ring 16 simulates the motion of the head and mouth of the horse. The student learns skillful use of the reins 10 by manipulating the reins 10 to avoid engagement or contact between the straight snaffle bit 8 and the ring 16.

Figure 3:
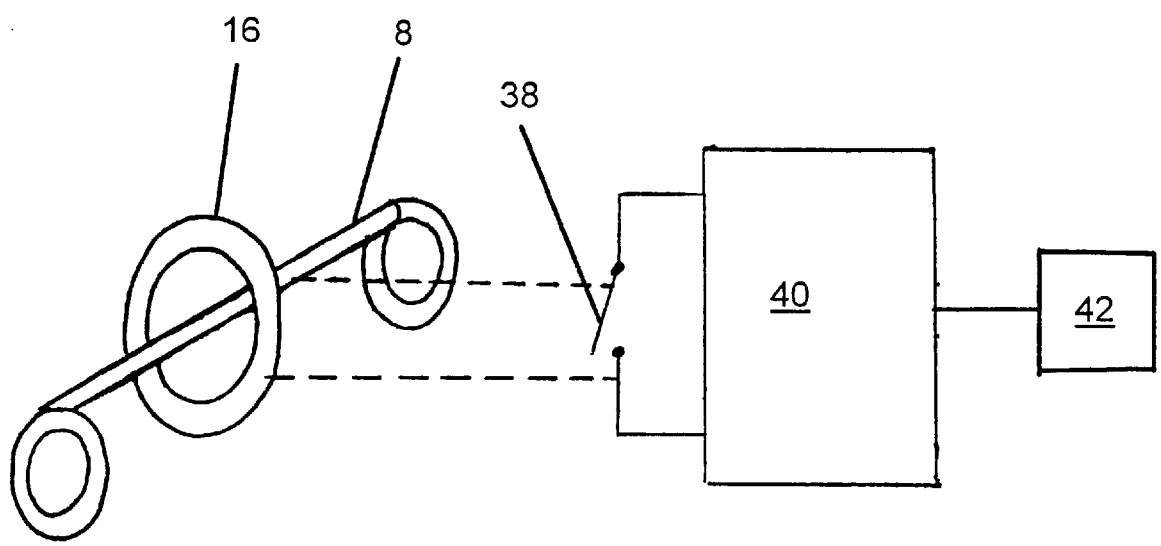
FIG. 3 is a schematic view of electrically operated alert means for notifying the student as to whether the student is properly operating the device.

The preferred embodiment of the apparatus 1 contemplates visual observation by the student of the ring 16 and snaffle bit 8 as a mechanical feedback mechanism to inform the student as to whether the student is skillfully operating the apparatus 1. Mechanical contact between the ring 16 and snaffle bit 8 also provides auditory feedback to the student. Other feedback mechanisms are contemplated by the invention. As shown in FIG. 3, ring 16 and straight snaffle bit 8 may operate an electrical switch 38 which is in turn electrically connected to an electrical system 40 and which activates an alert means 42. The ring 16 and bit 8 may themselves constitute electrical switch 38. The alert means 42 may be visual, audible or tactile, as, for example, a light, buzzer or vibrating alarm. An alternative is a vibrating alarm located in the hand of the student while the student is holding the reins 10, so that the student is provided immediate tactile feedback.

Figure 7:
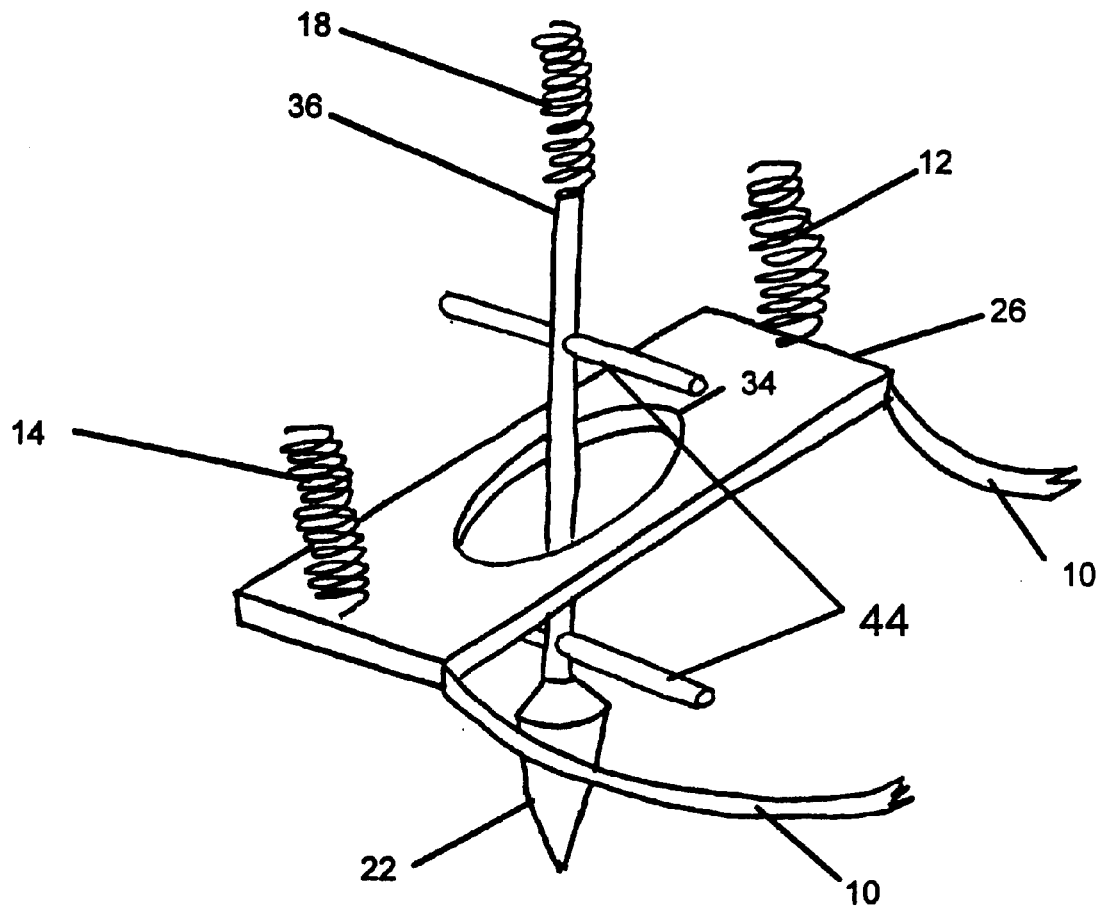
FIG. 7 is a perspective view of an alternative feedback means.

The use of the ring 16 and straight snaffle bit 8 as the mechanical feedback mechanism is the preferred embodiment, but is not the only mechanical feedback means contemplated by the invention. In the alternative embodiment illustrated in FIG. 7, instead of using snaffle bit 8 as in the preferred embodiment, we use alternative transverse member 26 which is provided with a hole 34. Weighted rod 36 is substituted for ring 16 in the pendulum 30 and extends through the hole 34. Engagement of the rod 36 and transverse member 26 provides feedback for movement in the horizontal plane. Vertical stops 44 extend from rod 36 and provide feedback concerning movement in the vertical direction.

In the preferred embodiment of the method of the current invention, instruction by a riding teacher is combined with simulating the motion of a horse's head and mouth, simulating the resistance to a bit in a horses mouth, and comparing the simulated motion of the horse's mouth to the location of the moveable bit as controlled by reins operated by a student.

Many changes and modifications may be made to the embodiment of the invention descried above. The scope of the invention is intended to be limited only by the scope of the appended claims.

I claim:

1. An apparatus for teaching a student the handling of a horse, comprising:
   a frame adapted to be operably connected to the student so that motion of the student is translated into motion of the frame;
   head means elastically attached to the frame so that movement of said head means is responsive to motion of said frame thereby simulating the motion of a locomoting horse;
   reins;
   bit means for simulating the motion of a bit in a horse's mouth connected to said frame and adapted to engage said head means, said bit means being connected to said reins;
   whereby a student may manipulate said rein so that said bit means maintains an instructor-determined relationship with respect to said head means.

2. The apparatus of claim 1, wherein the bit means comprises:
   a first elastic member having a first and a second end, said first end of said first elastic member being affixed to the frame, the reins having a first end and a second end, said second end of said first elastic member being affixed to said first end of the reins;
   a second elastic member, said second elastic member having a first and a second end, said first end of said second elastic member being affixed to the frame, said second end of said second elastic member being affixed to said second end of the reins.

3. The apparatus of claim 2, wherein the first and second elastic members comprise coil springs.

4. An apparatus for teaching a student the handling of a horse, comprising:
   a frame adapted to be connected to the student;
   head means for simulating the motion of a horse's head, said head means being connected to said frame;
   reins;
   bit means for simulating the motion of a bit in a horse's mouth connected to said frame and adapted to engage said head means, said bit means being connected to said reins; ps whereby a student may manipulate said reins so that said bit means maintains an instructor-determined relationship with respect to said head means;
   said bit means comprising:
      a first elastic member having a first and a second end, said first end of said first elastic member being affixed to the frame, the rein having a first end and a second end, said second end of said first elastic member being affixed to said first end of the rein;
      a second elastic member, said second elastic member having a first and a second end, said first end of said second elastic member being affixed to the frame, said second end of said second elastic member being affixed to said second end of the rein;
      said bit means further comprising a transverse member having a first end and a second end, said first end of said transverse member being attached to the second end of the first elastic member and said second end of said transverse member being attached to the second end of the second elastic member.

5. The apparatus of claim 4, wherein the transverse member is a straight snaffle bit.

6. The apparatus of claim 4, wherein the head means comprises a pendulum and means for elastically suspending the pendulum from the frame, said pendulum being free to move substantially in a plane parallel to the surface of the earth in response to motion by the frame, said pendulum also being free to move vertically in response to deformation of said pendulum elastic suspension means.

7. The apparatus of claim 6, wherein the means for elastically suspending the pendulum from the frame comprises a pendulum spring.

8. The apparatus of claim 6 further comprising feedback means adapted to engage the head means and the bit means to inform the student as to the student's maintenance of the instructor-defined relationship between the head means and the bit means.

9. The apparatus of claim 8, wherein the feedback means comprises the pendulum having an opening defining a ring, said ring encircling the transverse member so that said ring does not engage the transverse member when the apparatus is skillfully operated by the student.

10. The apparatus of claim 8, wherein the feedback means comprises:
    the transverse member having an opening;
    the pendulum being in the shape of a rod extending through said opening of the transverse member so that said rod does not engage said opening in the transverse member when the apparatus is skillfully operated by the student;
    a plurality of vertical stops attached to the pendulum so that said vertical stops do not engage the transverse member when the apparatus is skillfully operated by the student.

11. The apparatus of claim 8, wherein the apparatus further comprises alert means activated by the feedback means to notify the student as to the student's maintenance of the instructor-defined relationship between the bit means and the head means.

12. The apparatus of claim 11, wherein the alert means comprises:

an electrical switch activated by the feedback means;

an electrical system activated by said electrical switch;

a signal means activated by said electrical system, said signal means notifying the student whether the student is skillfully operating the apparatus.

13. The apparatus of claim 11, wherein the signal means provides an audible, visible or tactile signal.

14. The apparatus of claim 12, wherein the tactile signal is a vibrating signal.

15. The apparatus of claim 1, further comprising a rigid back brace depending from the frame and means for securing said back brace to the student.

16. The apparatus of claim 15, wherein the means for securing the back brace to the student comprises straps.

17. An apparatus for teaching to a student the handling of a horse, comprising:

a frame;

means for operably securing said frame to the student so that the student is free to move about while said frame is secured and so that motion of the student is translated into motion of said frame;

reins having a first and a second end;

means for elastically attaching said first end and said second end of said rein to said frame so that said first end and said second end of said rein may move with respect to said frame in response to tension placed on said rein by the student;

means for simulating the changing location of the mouth of a moving horse in response to motion of said frame;

feedback means for comparing (i) the location with respect to the frame of said first end and said second end of the rein (ii) to said simulated changing location of the horse's mouth so that the student may learn to adjust the tension applied to said rein in response to said simulated changing location of the horse's mouth.

18. The apparatus of claim 17, wherein the means for elastically attaching the first end of the reins to the frame comprises a first elastic member, said first elastic member having a first and a second end, said first end of said first elastic member being affixed to the frame, said second end of said first elastic member being affixed to the first end of the reins;

the means for elastically attaching the second end of the reins to the frame comprises a second elastic member, said second elastic member having a first and a second end, said first end of said second elastic member being affixed to the frame, said second end of said second elastic member being affixed to the second end of the reins.

19. The apparatus of claim 18, wherein the first and second elastic members comprise coil springs.

20. An apparatus for teaching to a student the handling of a horse, comprising:

a frame;

means for securing said frame to the student so that the student is free to move about while said frame is secured;

reins having a first and a second end;

means for elastically attaching said first end and said second end of said rein to said frame so that said first end and said second end of said rein may move with respect to said frame in response to tension placed on said rein by the student;

means for simulating the changing location of the mouth of a moving horse;

feedback means for comparing (i) the location with respect to the frame of said first end and said second end of the rein (ii) to said simulated changing location of the horse's mouth so that the student may learn to adjust the tension applied to said rein in response to said simulated changing location of the horse's mouth;

said means for elastically attaching the first end of the rein to the frame comprises a first elastic member, said first elastic member having a first and a second end, said first end of said first elastic member being affixed to the frame, said second end of said first elastic member being affixed to the first end of the rein;

the means for elastically attaching the second end of the reins to the frame comprises a second elastic member, said second elastic member having a first and a second end, said first end of said second elastic member being affixed to the frame, said second end of said second elastic member being affixed to the second end of the rein;

said means for elastically attaching the rein to the frame further comprising a transverse member having a first end and a second end, said first end of said transverse member being attached to the second end of the first elastic member and said second end of the transverse member being attached to the second end of the second elastic member.

21. The apparatus of claim 20, wherein the transverse member is a straight snaffle bit.

22. The apparatus of claim 20, wherein the means for simulating the changing location of the mouth of a moving horse comprises a pendulum and means for elastically suspending said pendulum from the frame, said pendulum being free to move substantially in a plane parallel to the surface of the earth in response to motion by the frame, said pendulum also being free to move vertically in response to deformation of said pendulum elastic suspension means.

23. The apparatus of claim 22, wherein the means for elastically suspending the pendulum from the frame comprises a pendulum spring.

24. The apparatus of claim 22, wherein the feedback means for comparing the locations of the first and second ends of the reins to the simulated changing location of the horse's mouth comprises the pendulum having an opening defining a ring, said ring encircling the transverse member so that said ring does not engage the transverse member when the apparatus is skillfully operated by the student.

25. The apparatus of claim 22, wherein the feedback means for comparing the locations of the first and second ends of the reins to the simulated changing location of the horse's mouth comprises:

the transverse member having an opening;

the pendulum being in the shape of a rod extending through said opening of the transverse member so that said rod does not engage said opening in the transverse member when the apparatus is skillfully operated by the student;

a plurality of vertical stops attached to the pendulum so that said vertical stops do not engage the transverse member when the apparatus is skillfully operated by the student.

26. The apparatus of claim 17, wherein the apparatus further comprises alert means activated by the feedback means to notify the student as to whether the student is skillfully operating the apparatus.

27. An apparatus for teaching to a student the handling of a horse, comprising:

a frame;

means for securing said frame to the student so that the student is free to move about while said frame is secured;

reins having a first and a second end;

means for elastically attaching said first end and said second end of said rein to said frame so that said first end and said second end of said rein may move with respect to said frame in response to tension placed on said rein by the student;

means for simulating the changing location of the mouth of a moving horse;

feedback means for comparing (i) the location with respect to the frame of said first end and said second end of the rein (ii) to said simulated changing location of the horse's mouth so that the student may learn to adjust the tension applied to said rein in response to said simulated changing location of the horse's mouth;

alert means comprising an electrical switch activated by the feedback means; an electrical system activated by said electrical switch; a signal means activated by said electrical system, said signal means notifying the student whether the student is skillfully operating the apparatus.

28. The apparatus of claim 27, wherein the signal means provides an audible, visible or tactile signal.

29. The apparatus of claim 28, wherein the tactile signal is a vibrating signal.

30. The apparatus of claim 17, wherein the means for securing the frame to the student further comprises a rigid back brace depending from the frame and means for securing said back brace to the student.

31. The apparatus of claim 30, wherein the means for securing the back brace to the student comprises straps.

* * * * *

UNITED STATES PATENT AND TRADEMARK OFFICE
CERTIFICATE OF CORRECTION

PATENT NO    : 6,093,025
DATED        : July 25, 2000
INVENTOR(S)  : Jill F. Willcox It is certified that error appears in the above-identified patent and that said Letters Patent are hereby corrected as shown below:

Claim 4, column 6, line 15 after the word "reins;" delete the letters "ps".

Signed and Sealed this

Seventeenth Day of April, 2001

Attest:

NICHOLAS P. GODICI

Attesting Officer

Acting Director of the United States Patent and Trademark Office